United States Patent Office

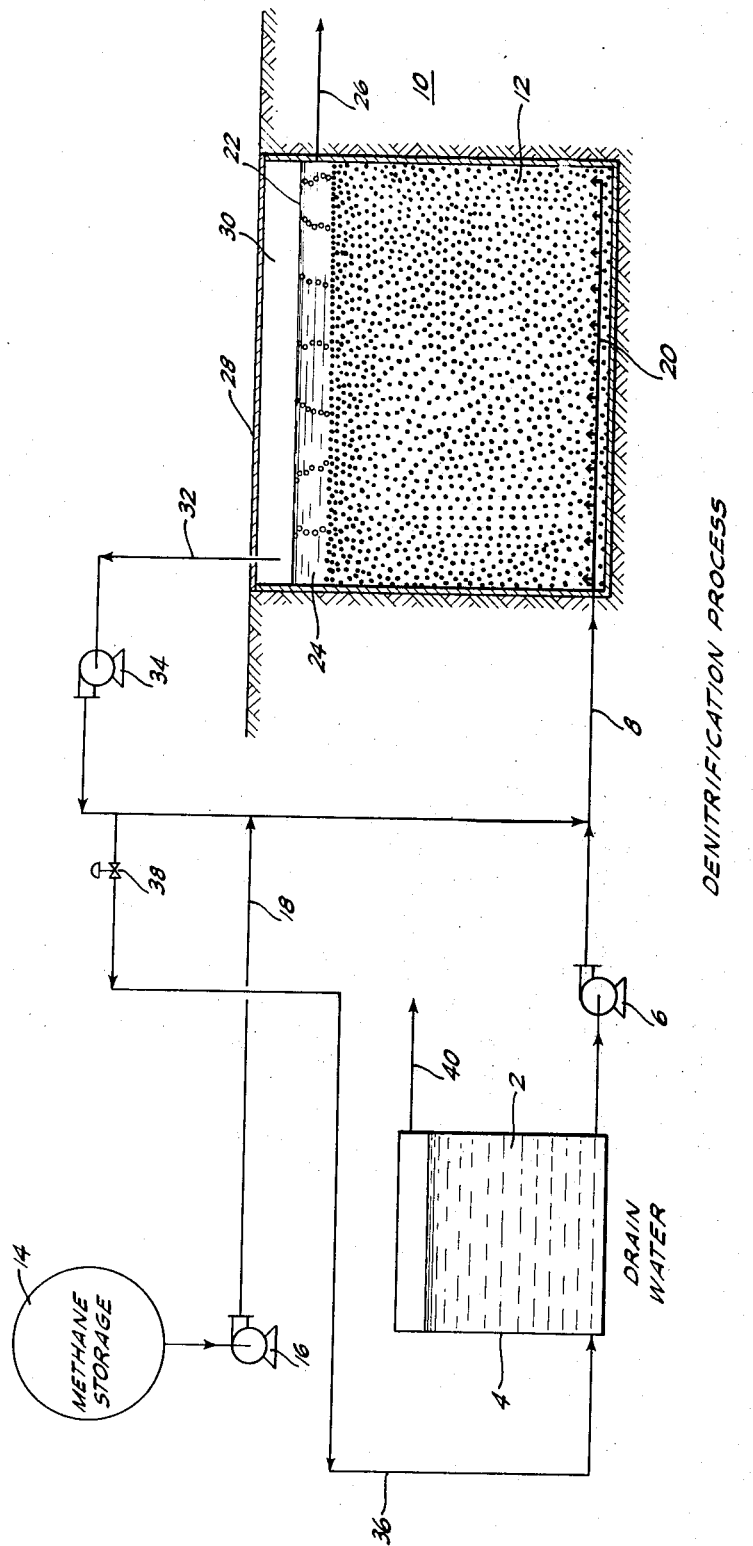

3,829,377
Patented Aug. 13, 1974

3,829,377
REDUCTION OF WATER POLLUTION BY BIOLOGICAL DENITRIFICATION
Saburo Hashimoto, Yorba Linda, Calif., assignor to Union Oil Company of California, Los Angeles, Calif.
Continuation-in-part of abandoned application Ser. No. 89,976, Nov. 16, 1970. This application Feb. 7, 1973, Ser. No. 330,300
Int. Cl. C02c 1/14
U.S. Cl. 210—11     10 Claims

ABSTRACT OF THE DISCLOSURE

A process for the biological denitrification of water that contains soluble nitrates is disclosed. In the process, the water is contacted with anaerobic bacteria and a normally gaseous $C_1$ to $C_3$ hydrocarbon for a time sufficient to degrade the nitrate ions, biologically, to innocuous nitrogen.

This application is a continuation-in-part of my copending application Ser. No. 89,976, filed Nov. 16, 1970, now abandoned.

DESCRIPTION OF THE INVENTION

This invention relates to the biological denitrification of nitrates in water and more particularly to a method of biologically reducing the amount of nitrates in irrigation drainage water.

The widespread application of industrial fertilizers to agriculture lands has resulted in a slow accumulation of nitrogen compounds, particularly the nitrates, in the soils. While most of the nitrogen fertilizers are utilized by land supported vegetation, a small amount of the nitrogen compounds are leached from the soil by irrigation water and are carried to contiguous lakes, rivers and ocean. Nitrogen monitoring of the water in the San Francisco Bay, for example, evidences a continual buildup of nitrogen compounds. Analysis of these nitrogen compounds further shows that approximately 98 percent of the compounds exist as nitrates. Attempts to recycle the drainage water to avoid nitrate buildup in the lakes, rivers, etc., result in a harmful accumulation of leached mineral salts in the water which renders it unsuitable for further irrigation purposes.

The soluble nitrates in the drainage water, while not presenting any particular detriment to plant life, possess a serious threat to higher animals that consume the water. Such nitrate laden water also possesses a threat to man, and many cities have enacted health regulations condemning water as unfit to drink when the nitrate concentration attains a certain level. In addition to the obvious health problems, the buildup of nitrates also possesses other detriments. For example, it is estimated that the high content of nitrates in the San Francisco Bay causes approximately 7 million dollars a year of damages because of odors, fish damage, damage to boat paint, etc.

Several methods have been suggested to alleviate the problem of nitrate buildup in drain waters but these have been found to be economically unfeasible. For example, ion-exchange resins have been proposed to exchange the nitrate ions in the drain water for less harmful ions. This method has proved to be unacceptable because of the high capital investment and low efficiency in ion exchange of the low nitrate content drainage water.

Another proposal is to use aerobic bacteria to break down the nitrates to nitrogen and proteins. In this method, a liquid hydrocarbon and oxygen are passed through the nitrate containing water which contains the aerobic bacteria. The bacteria reduce the nitrates to molecular nitrogen. This process has been found to be uneconomical in its application to irrigation drainage water because of the low solubility of oxygen in the water, thereby requiring extensive sparging and also because of the low concentration of nitrates.

A more successful method has recently been proposed which employs methanol or acetic acid and anaerobic bacteria to reduce the nitrates to nitrogen. This method has been fairly successful in reducing the nitrate concentration in drainage water but is not economically attractive because of the high cost of the organic additive, methanol or acetic acid. Thus a need still exists for a process to reduce the nitrate content of water that does not require extensive capital investment, or incur high operating expenses, and that is simple to install and operate.

It is therefore an object of this invention to provide a method for reducing the nitrate content of aqueous solutions.

It is another object of this invention to provide a method for reducing the content of nitrate ions in irrigation drainage water by biological denitrification.

It is another object of this invention to provide a method for reducing the content of nitrate ions in irrigation drainage water by denitrification with anaerobic bacteria.

Other and related objects will become apparent to those skilled in the art from the following description of the invention.

The above objects and attendant advantages can be attained by subjecting the water which contains the soluble nitrates to biological denitrification by the bacterial action of anaerobic bacteria on the nitrates in the presence of an organic energy source consisting essentially of a $C_1$ to $C_3$ hydrocarbon or mixtures thereof. Exemplary hydrocarbons which can be used herein are methane, ethane, ethylene, propane and propylene with methane being the preferred organic energy source because of its availability and low cost. In the process, the nitrate containing water is inoculated with the anaerobic bacteria and the hydrocarbon is passed through the water at ambient or near ambient temperatures. The hydrocarbon is a gas under ambient conditions and such hydrocarbon gas is continuously passed through the water for a period sufficient to reduce the nitrates to nitrgoen. When the nitrate concentration is reduced the bacterial action subsides until essentially no biological action takes place. The purified water is then allowed to continue on in its original ecological path.

The practice of this invention can be conveniently applied to the reduction of soluble nitrates in irrigation drainage water. Irrigation drain water is commonly collected by subsurface drains beneath the irrigated soil. The water has a very low content of suspended material since it has percolated through the soil and any suspended material such as organic solids and oils are filtered therefrom by the soil. Even when open drains are used to collect the water, its slow movement over and through the soil fails to entrain any significant amounts of organic matter. Typically, the amount of organic material present does not exceed about 5 parts per million (p.p.m.) and usually is no greater than about 1.5 p.p.m. In some waters, there may be no detectable amount of organic matter. For comparison, this amount of organic material is about 0.1 to about 1 percent of the organic material which is present in most sewage.

The nitrate anion accounts for 90 to about 99 percent of the nitrogen compounds in the drain water with trace amounts (0.01 to 0.1 p.p.m.) ammonia and nitrite also being present. The nitrate can be present in the water to be treated in amounts from 10 to about 200 p.p.m. and, usually, from about 15 to about 50 p.p.m. The water collected by open surface drains can contain from 1 to 10 p.p.m. nitrate while that collected by subsurface drains can contain from 5 to about 100 p.p.m. nitrate. Often, the treatment facilities will receive blends of such drain waters.

The waters also contain slight amounts of phosphates, e.g., from about 0.1 to about 1 p.p.m., most of which is present as the orthophosphate anion.

As will be apparent from the more detailed description of the denitrification process set forth herein, the agricultural drain waters do not contain sufficient amounts of organic material to effect biological denitrification. Generally, the organic material requirements are a multiple of the nitrate concentration, e.g., from 1.5 to about 5 times that of the nitrate concentration. Accordingly, the organic requirements can be from about 15 to 1000 p.p.m. for the aforementioned range of nitrate concentrations. This far exceeds the amount of organic material that may be present in the waters.

The drainage water can be treated directly after leaving the agricultural farm lands or, alternatively, the water can be stored in reservoirs and then transported to a treating facility. At the treating facility, the water is subjected to biological denitrification by the practice of this invention, and, at the end of the treatment, the water is treated to kill any animal pathogens which may exist in the purified water. If, however, non-pathogenic bacteria are employed, the bacteria can be allowed to exit with the drainage water. The bacteria within the purified water poses no problem for subsequent irrigations or other purposes since the problems of nitrate buildup are no longer present. In some instances it may be advantageous to remove the bacteria from the denitrified water and, in these cases, the bulk of the bacteria can be removed by conventional filtering means.

While the exact mechanism of nitrate denitrification is not known with certainty, it is believed that denitrification of the water by the anaerobic bacteria of this invention proceeds by both dissimilation and assimilation of the nitrate-nitrogen. In dissimilation, the nitrate ions act as terminal hydrogen acceptors in the bacteria metabolism. When an adequate concentration of degradable organic material is present, the bacteria are capable of utilizing the hydrogen acceptors in completely reducing the nitrate ions to molecular nitrogen, thereby liberating nitrogen gas. In assimilation, on the other hand, the bacteria reduce the nitrate-nitrogen to an intermediate valence and incorporate the nitrogen into their cellular material as simple proteins.

The ability of anaerobic bacteria to bring about denitrification through dissimilation and assimilation varies greatly, depending upon the type of bacteria selected and the operating conditions. Some bacteria, for example, only reduce nitrate ions to nitrites, while others only reduce nitrates to molecular nitrogen, and still others reduce both nitrates and nitrites to molecular nitrogen. Additionally, the amount of nitrate reduction attributed to dissimilation or assimilation also depends upon the type of bacteria selected. These differences can be averaged by employing a mixed bacteria culture so that all of the above processes can take place concurrently, with the ultimate result of a continuous reduction of nitrates to molecular nitrogen.

The bacteria which can be employed in the practice of this invention are those capable of reducing nitrates in water under anaerobic or substantially anaerobic conditions. These bacteria can be anaerobes or facultative aerobes capable of existing under anaerobic conditions. The expression "anaerobic" as defined herein therefore encompasses anaerobic, facultative anterobic and facultative aerobic bacteria. Many of the anaerobic bacteria which can be employed to denitrify nitrates in accordance with the practice of this invention are already present in irrigation drainage water and, therefore, extraneous inoculation of the water with suitable anaerobes is generally not necessary.

When practicing the invention in a continuous fashion, inoculation of the water is generally not necessary. It may, nevertheless, be advantageous to employ a mixed bacteria culture which can be added to the water. This can be achieved by inoculating the water with sewage sludge, or the like. Preferably, a mixed bacteria culture is specifically grown under ideal growth conditions in an aqueous medium containing a high nitrate concentration such as from 1 to 5 weight percent which is contacted with a $C_1$ to $C_3$ hydrocarbon or other organic energy source such as methanol, ethanol, propanol, acetone, acetic acid, etc., or combinations thereof at high concentrations. By inoculating the water with such a mixed bacteria culture, several nitrate reducing strains can be maintained within the water for rapid denitrification.

Exemplary anaerobic, facultative aerobic and facultative anaerobic bacteria which are capable of degrading nitrates and may be utilized herein include bacteria from the genera of Thiobacillus, such as *Thiobacillus denitrificans*, etc.; Pseudomonas, such as *Pseudomonas viscosa, Pseudomonas ureae, Pseudomonas denitrificans, Pseudomonts petasites, Pseudomonas polycolor, Pseudomonas seminum, Pseudomonas xanthochlora, Pseudomonas castaneae*, etc.; Chromobacters, such as *Chromobacterium amethystinum, Chromobacterium violeceum*, etc.; Bacillus, such as *Bacillus michaelisii, Bacillus edgeworthiae, Bacillus nitroxus*, etc.; and Clostridium, such as *Clostridium viscifaciens, Clostridium acetobutylicum, Clostridium felsineum*, etc.

In the denitrification of this invention, the anaerobes are contacted with the nitrates and an organic energy source consisting essentially of a $C_1$ to $C_3$ hydrocarbon or mixtures thereof under substantially anaerobic conditions to effect a reduction in nitrate concentration and a simultaneous consumption of hydrocarbon. The amount of hydrocarbon required varies depending upon the nitrate concentration, oxygen concentration, the type of bacteria selected and the process conditions. This amount can be estimated, however, by an equation presented by Tarblyn, T. A., et al. in a paper presented on Dec. 16, 1969 at the American Geophysical Union Fall National Meeting, entitled "Bacterial Denitrification of Agriculture Tile Drainage." The following is the equation representing the required hydrocarbon concentration:

$$C_m = (1.9N_0 + 1.18N_1 + 0.67D_0)C_r$$

wherein:

$C_m$ is the required concentration of degradable organic matter, mg./l.;
$N_0$ is the nitrate-nitrogen concentration, mg./l.;
$N_1$ is the nitrite-nitrogen concentration, mg./l.;
$D_0$ is the dissolved oxygen concentration; and
$C_r$ is an empirical determined consumptive ratio, which is the ratio of the actual organic matter requirement to the stoichiometric requirement for denitrification by dissimilation and deoxygenation of the water.

The consumptive ratio ($C_r$) varies between organisms and the environment in which denitrification takes place. Thus the ratio must be experimentally measured in each case to determine the hydrocarbon requirements where knowledge of this quantity is desired. The consumptive ratio can be determined by an experiment wherein the particular bacteria or mixed culture are contacted with an aqueous solution containing a known amount of nitrates and dissolved oxygen. The selected $C_1$ to $C_3$ hydrocarbon is passed through the aqueous mixture and the amount of hydrocarbon consumed during denitrification is recorded. The consumptive ratio is determined by dividing the gram weight of hydrocarbon consumed in the experiment by the stoichiometric gram amount of hydrocarbon required to convert the dissolved nitrates and oxygen to nitrogen gas and water. When using this invention, however, predetermination of the hydrocarbon requirements is not necessary. Instead, the treatment can simply be continued so long as the water contains objectionable amounts of nitrates. The organic materials are gaseous at ambient or treatment temperatures and have only limited solubilities in water. Any excess amounts of organic material readily degasses or vaporizes from the water when the water is removed from the treatment. This is a distinct advantage over the use of materials such as acetic acid or methanol which, if supplied in excess, contaminates the treated water. The nitrate concentration of the water can simply be monitored by periodic inspection or analysis of the water for its nitrate content and the water can be removed from treatment when its nitrate content reaches an acceptable level.

The amount of $C_1$ to $C_3$ hydrocarbon required, as shown by the above equation, is dependent upon the nitrate concentration in the water. Generally, the nitrate concentration in irrigation drain water ranges from about 10 parts per million to about 200 parts per million, and usually between about 15 and 50 parts per million. When untreated water containing less than 10 parts per million of nitrates are encountered, the denitrification process proceeds very slowly and the amount of hydrocarbon required may be less than the amount sufficient to saturate the water. However, when higher concentrations of nitrates are encountered, a faster nitrate degradation occurs in which case it is preferred to continuously pass an excess of the hydrocarbon through the water.

A significant reduction in nitrate content is desired. Typically, the nitrate content should be reduced by 40 percent and, preferably, reduced by at least 75 percent. Depending on the intended disposal or subsequent use of the water, it may be desirable to effect from 90 to 99 percent denitrification. The levels of nitrate content of the treated water would thus be from about 1 to about 15, preferably from 2 to about 10 p.p.m.

While a $C_1$ to $C_3$ hydrocarbon must be present during the denitrification procedure of this invention, it is recognized that minor amounts of other organic energy sources may be also added to the water, such as acetone, methanol, ethanol, propanol, acetic acid, etc. If other organic energy sources are employer, it is preferred that they be used in minor amounts to supply no more than about 25 and, preferably, no more than about 10 percent of the total organic material requirements.

The denitrification must be carried out under conditions suitable for the anaerobes selected. Generally, the process is carried out at ambient temperatures such as from about 50° to 120° F. The optimum temperature, however, is more or less dictated by the anaerobes selected for the process and it is preferred to operate near this optimum temperature. Most bacteria are not susceptible to pressure and, accordingly, the practice of this invention can be performed under pressurized systems, such as from 1 to 10 atmospheres absolute. When high concentrations of nitrates are encountered, such as above 50 parts per million, it may be advantageous to employ pressurized systems so as to increase the amount of methane which can then be made available for the anaerobes.

In a preferred embodiment of this invention, the anaerobic bacteria are preconditioned with an alkanol prior to the addition of the hydrocarbon to the system. In this embodiment, the denitrification is originally conducted in the presence of a corresponding $C_1$ to $C_3$ alkanol and, as the bacteria gradually degrade the nitrate ions, the alkanol concentration is slowly decreased. Simultaneously, the $C_1$ to $C_3$ hydrocarbon is added in progressively greater amounts so that the decrease in alkanol concentration is offset by an equivalent increase in hydrocarbon concentration. This procedure is followed until only the $C_1$ to $C_3$ hydrocarbon is present during the denitrification. In this manner, the anaerobic bacteria can be slowly conditioned to the hydrocarbon as the organic degradable source.

The denitrification process can be conducted in any suitable holding means which will allow the untreated water to be contacted with the anaerobic bacteria and hydrocarbon for a time sufficient to denitrify the water. Exemplary holding means include covered ponds, reactors, submerged tile drains, covered gravel pits, etc. Accordingly, in the practice of this invention, the nitrate containing water is introduced into the holding means, preferably at the bottom, so that the water flows upwardly during denitrification and is continuously passed therethrough in a plug-flow manner. The size or capacity of the holding means, as well as the water flow rate, are selected so that the residence time of the untreated water within the holding means is sufficient for the anaerobes to reduce, biologically, the nitrate concentration to the desired level. Although the residence time within the holding means varies greatly with the selected anaerobic bacteria and process conditions, it generally ranges from about 1 to 10 days.

The holding means can contain a bed of aggregate or particulate solids. This is advantageous since the solids provide a surface for growth of the bacteria. A substantial quantity of the bacteria will be retained on the solid surfaces rather than becoming entrained in the water effluent from the treatment. Occasional cleaning of the bacteria from the solids may be required to prevent plugging of the bed. The bacteria so removed can be recovered and treated in a conventional fashion to obtain a dry solid high in protein content which would be suitable as a soybean meal substitute.

The denitrified water leaving the process may contain a substantial number of live bacteria some of which may be pathogenic to animals or plants. In instances where plant or animal pathogens are present in the dentrified water, it may be advantageous to kill or otherwise render harmless these pathogens. There are several methods of killing or disabling bacteria, some of which include the addition of chemicals to the water, the application of ultraviolet light to the water, increasing the temperature of the water beyond the tolerance temperature for the bacteria, changing the water pH, etc.

The application of chemicals to the water is in many instances the preferred mode for disabling the bacteria because of the small amount of chemical generally needed. For example, a chemical such as chlorine may be added to the water in amounts less than 1 part per million free chlorine to effectively disable the bacteria. The amount of chlorine necessary to disable the bacteria depends upon the ultimate use of the water. For example, if the water is to be used for drinking purposes, then from 0.2 part per million or more of free chlorine is generally recommended. If, on the other hand, the water is being discharged into the ocean or lake, it may not be necessary to add any chlorine. Another chemical which may be employed herein is copper sulfate. Copper sulfate is effective to kill certain types of bacteria such as those within the genus of Closterium, and only 0.17 part per million is generally necessary to kill most of the bacteria.

The application of ultraviolet light to kill the bacteria has many advantages over the addition of chemicals to the water but, on the other hand, is generally more expensive to operate. The amount of ultraviolet light required to kill the bacteria depends upon the type of bacteria exposed to the light. The killing effectiveness (E) of the light is dependent upon the product of radiation intensity (I) and time ($t$) as shown by the following equation, and which holds true over a wide range of exposures:

$$E=(I)(t)$$

Most bacteria are killed by approximately 40,000 ergs per square centimeter with some bacteria capable of sustaining 200,000 ergs per square centimeter of light having a wavelength of about 2400–2900 A.U. As an example of light intensity, a 30 watt, low pressure mercury-vapor lamp gives about 800 ergs per square centimeter per second at 2537 A.U., measured at a meter's distance and an exposure of about two minutes is generally sufficient to kill the large majority of bacterial cells.

The use of temperature to kill bacteria is not feasible when using irrigation drainage water because of the enormous quantity of water involved. However, when aqueous solutions in small quantities are encountered it may be feasible to kill the bacteria by raising the water temperature. Generally, a temperature of from 120 to 150° F. is sufficient to kill the majority of bacteria in the water.

Referring now to the figure, there is illustrated an embodiment of the denitrification process of this invention. In the figure, drain water 2 from an irrigation system is held in storage tank 4 and transported therefrom through pumps 6 and pipeline 8 to holding tank 10. Holding tank 10 can comprise a submerged pit which can contain gravel 12 as packing. The packing is provided to increase the available surface area to the anaerobes. A methane containing gas from storage tank 14 is transported through pump 16 and pipeline 18 to pipeline 8 and holding tank 10. The drain water and methane gas in pipeline 8 are introduced into the bottom of holding tank 10 and uniformly distributed therein through sparger 20. The drain water gradually rises within holding tank 10 and denitrification of the nitrate ions proceeds as the water rises in the tank. During denitrification, a major portion of the nitrates are converted to nitrogen gas which partly dissolves in the water. The remainder of the nitrogen gas slowly rises to the liquid surface 22. The denitrification process is preferably conducted with an excess of methane and a major portion of gas 30 generally comprises methane with the remainder comprising nitrogen released during the process. The invention thus insures that anaerobic conditions exist in the denitrification step since an oxygen-free vapor is present above the water undergoing treatment. The circulation of the hydrocarbon gas also sweeps any oxygen, which may be present in the feed water, from the treatment step. When an excess of methane is not employed, covering 28 can be disregarded and the liberated nitrogen gas can be vented directly to the atmosphere. However, when an excess of methane is used, it is preferred to recover the gas 30 and to recycle the same. In recycling, the gas is conveyed by pipeline 32 to pump 34 and back to pipeline 8 and sparger 20. A small amount of the gas can be bled from line 32 by line 36 and valve 38 to prevent an accumulation of nitrogen within the system. The bleed gas can be transported to the bottom of drain tank 4 and bubbled through drain water 2 to remove any entrained methane. The nitrogen leaving storage tank 4 can be vented to the atmosphere through vent line 40.

While the above disclosure of the drawing represents a preferred mode of practicing the invention, it is recognized that many modifications can be made without changing the essence of the invention and such modifications are considered within the scope of the invention.

The following example is presented to illustrate the results obtainable in the practice of one embodiment of this invention, but is not to be construed as limiting the scope of the invention as defined by the appending claims.

EXAMPLE

In this example, a series of experimental tests are presented to demonstrate the effectiveness of anaerobic bacteria in denitrifying nitrates in water in the presence of methane. In the experiments, two 2-liter, graduated cylinders are filled with drain water containing 2500 parts per million of total dissolved salts and 36 parts per million of nitrates, expressed as nitrogen. The drain water is obtained from the California Department of Water Resources at Firebaugh, Calif. Since this irrigation drainage water inherently contains anaerobes capable of degrading nitrates, no extraneous addition of suitable anaerobes is made.

Methane is introduced into one of the cylinders through a gas sparger which is placed at the bottom of the cylinder. The rate of methane passed through the drainage water is sufficient to maintain a constant flow of gas bubbles through the water. The excess methane leaving the surface of the water is allowed to vent directly to the atmosphere. The other cylinder is maintained quiescent and used as a blank in the experimental runs.

Methane is passed through the cylinder for 44 days at ambient temperature and atmospheric pressure. At the end of the 44-day period, the water in each cylinder is analyzed for nitrate content and the results of this analysis is reported in Table I:

TABLE I

| Experiment | Methane added | Nitrate concentration (p.p.m.) | |
| --- | --- | --- | --- |
| | | Initial | Final |
| 1 | No | 36 | 36 |
| 2 | Yes | 36 | 20 |

It can be seen from the above table that the addition of methane to the cylinder reduced the nitrate concentration from 36 to 20 parts per million. Although the residence time of 44 days employed in the above experiments is quite prolonged, a major portion of this time is consumed in building up the bacteria population sufficient for rapid denitrification. Samples of the test water in each of the cylinders above is analyzed periodically for the nitrate ion concentration and such analyses confirms that very little denitrification occurs during the first few weeks of testing and that the biological action increases more rapidly near the end of the testing period.

In an operating unit, the bacteria population will be initially developed, as here, but a high population can be maintained within the treating facility by employing a packing within the holding means, such as for example, gravel, etc. The packing provides an available surface area on which a large bacteria population may attach and thereby provide for rapid denitrification of incoming drain water. It is recognized, however, that the packing is unnecessary and that a large bacteria population can be maintained by filtering the pure water effluent and recycling the filtered bacteria back to the treating facility. By maintaining a high bacteria population within the holding means of the treating facility, the residence time to adequately denitrify conventional drain may be held within about 1 to 10 days and a long resident time such as 44 days as employed in the example may be avoided.

I claim:

1. In a process for the biological denitrification of irrigation drainage water containing from about 10 to 200 parts per million of nitrate ions and no more than about 5 parts per million of organic material by the action of anaerobic bacteria the improvement comprising denitrifying said drainage water in the presence of said anaerobic bacteria by supplying to said water during said denitrification an organic energy source for said bacteria consisting essentially of a $C_1$ to $C_3$ hydrocarbon.

2. The process defined in claim 1 wherein said anaerobic bacteria are preconditioned with a $C_1$ to $C_3$ alkanol prior to said contacting.

3. The process defined in claim 1 wherein said anaerobic bacteria are selected from the genus consisting of Thiobacillus, Pseudomonas, Chromagtoer Bacillus and Clostridium.

4. The process defined in claim 1 wherein said hydrocarbon is methane.

5. The process defined in claim 4 wherein an excess of methane is contacted with said drainage water during said denitrifying and a portion thereof is recovered.

6. The process defined in claim 4 wherein said water is irrigation drain water containing from 15 to 50 parts per million of nitrate ions.

7. A process for reducing nitrate ion concentration in an aqueous solution containing from about 10 to 200 parts per million of nitrate ions and no more than about 5 parts per million organic material which comprises denitrifying said aqueous solution by contacting said solution with denitrifying anaerobic bacteria capable of degrading nitrate ions and supplying thereto an organic energy source consisting essentially of a $C_1$ to $C_3$ hydrocarbon as the organic degradable material; said denitrifying being conducted for a period sufficient to reduce at least a portion of said nitrate ions to molecular nitrogen and under temperature and pressure conditions conducive for said bacteria to degrade said nitrate ions.

8. The process defined in claim 6 wherein said anaerobic bacteria are selected from the genus consisting of Thiobacillus, Pseudomonas, Chromobacter, Bacillus and Clostridium.

9. The process defined in claim 6 wherein an excess of said $C_1$ to $C_3$ hydrocarbon is contacted with said aqueous solution during said denitrifying portion thereof is recovered.

10. The process defined in claim 6 wherein said water is irrigation drain water containing from 15 to 50 parts per million of nitrate ions.

References Cited
UNITED STATES PATENTS

| | | | |
|---|---|---|---|
| 3,709,364 | 1/1973 | Savage | 210—11 X |
| 3,645,846 | 2/1972 | Imada et al. | 195—95 X |
| 3,607,736 | 9/1971 | Yusho | 210—11 |
| 3,713,543 | 1/1973 | Heaney | 210—275 X |
| 3,464,919 | 9/1969 | Barta et al. | 210—11 |
| 3,383,309 | 5/1968 | Chandler | 210—11 |

JOHN ADEE, Primary Examiner

R. H. SPITZER, Assistant Examiner